United States Patent [19]

Langenmayr

[11] Patent Number: 5,336,329
[45] Date of Patent: Aug. 9, 1994

[54] PROCESS FOR TOXIC AGENT REMOVAL

[75] Inventor: Eric J. Langenmayr, Laverock, Pa.

[73] Assignee: Rohm and Haas Company, Philadelphia, Pa.

[21] Appl. No.: 986,405

[22] Filed: Dec. 7, 1992

[51] Int. Cl.$^5$ .............................. B08B 7/00
[52] U.S. Cl. ............................ 134/7; 134/6
[58] Field of Search .......... 134/6, 7, 42, 902; 252/174.23

[56] References Cited

U.S. PATENT DOCUMENTS

| | | | |
|---|---|---|---|
| 4,040,990 | 8/1977 | Neely | 260/2.1 R |
| 4,224,415 | 9/1980 | Meitzner et al. | 521/38 |
| 4,263,407 | 4/1981 | Reed, Jr. | 521/33 |
| 4,839,331 | 6/1989 | Maroldo et al. | 502/416 |
| 5,100,477 | 4/1992 | Chromecek et al. | 134/7 |

OTHER PUBLICATIONS

Ion Exchange Resins as Catalysts in the Decomposition of Sarin, Journal of Polymer Science, vol. XXXI, pp. 399–414 (1958).

*Primary Examiner*—Wayne Langel
*Assistant Examiner*—Thomas G. Dunn, Jr.
*Attorney, Agent, or Firm*—John E. Taylor, III

[57] ABSTRACT

A process for decontaminating a surface contaminated with a toxic agent in which the surface is contacted with a sorbent selected from the class consisting of a carbonaceous resin which contains a strong base in its pores, a macroreticular ion exchange resin which has a strong base hydroxide functionality and which contains water in its pores or a macronet resin which has been impregnated with a Lewis acid and then removing the toxic agent from the surface thereby decontaminating the surface.

14 Claims, No Drawings

PROCESS FOR TOXIC AGENT REMOVAL

This invention was made under United States Government contract DAMD 7-86-C-6192-United States Army Medical Research and Development Command. The U.S. Government has rights under this invention.

BACKGROUND OF THE INVENTION

This invention relates to the decontamination of a surface which has been contaminated with a toxic agent. The sorbent used for the decontamination is a ground material having a specified maximum particle size. The material, prior to grinding, has either been functionalized with a strong base or has had a strong base or Lewis acid imbibed therein.

There have been numerous approaches to the problem of decontaminating a surface which has been contaminated with a toxic agent such as a choking agent, (i.e. phosgene, diphosgene, and chlorine); blood agents such as hydrogen cyanide; vomiting agents, for example diphenylchloroarsine; nerve agents such as Sarin (isopropyl methylphosphonofluoridate); and blister agents such as nitrogen mustards. Early attempts at decontamination involved materials such as a salve containing, as its active ingredients, sodium hydroxide and phenol.

Other approaches for toxic agent decontamination involved the use of material such as carbon, or fumed silica or combinations thereof for the removal of toxic agents. Although these materials did, in fact, remove toxic agents, they were not effective in neutralizing the toxic agents so that the agent was actually transferred to another material which then had to be neutralized.

One very effective method for removing toxic agents from a surface, including human skin, is the use of a kit which contains an active ingredient AMBERGARD® XE-555 resin, obtained from Rohm and Haas Company of Philadelphia, Pa. This resin contains a carbonaceous adsorbent, a strong base anion exchange polymer in the hydroxide ion form, a strong acid cation exchange polymer in the hydrogen ion form, amorphous silica and water. The AMBERGARD® XE-555 resin was incorporated into a kit referred to as the M-291-Skin Decontaminating Kit. This kit has been accepted by the United States military and has been supplied to the United States military for use under actual battle conditions.

Although the M-291 kit is a great advance in the art and is now considered the state of the art skin decontaminating kit, it was believed that even more efficacious materials for removing toxic agents could be developed and would be desired by the military.

PRIOR ART

"Ion Exchange Resins as Catalysts In the Decomposition of Sarin", Chasanov, et al., *Journal of Polymer Science*, Volume XXXI, pages 399–414 (1958) discloses that Sarin may be hydrolyzed by using ion exchange resins to catalyze the decomposition of the Sarin (phosphonofluoridate). The ion exchange resins used to catalyze the decomposition by hydrolysis are strongly anionic resins such as AMBERLITE® IRA-400 obtained from Rohm and Haas Company Philadelphia, Pa. The article also discloses that strongly cationic resins such as DOWEX® 50 may be used to catalyze the hydrolysis of Satin, and thus the decomposition, of Sarin. The article invites attention to the fact that the catalytic effectiveness of the resins is relatively short lived in solutions containing dissolved electrolytes. Further, the article fails to teach or suggest the positive effects of a carbonaceous adsorbent which contains sodium hydroxide within its pores or of a macroreticular ion exchange resin which has a strong base hydroxide functionality and contains a defined amount of water or of a macronet resin which has been impregnated with a Lewis acid, when used in a process for removing toxic agents.

U.S. Pat. No. 5,100,477, Chromecek, et al., issued Mar. 31, 1992 discloses a process for decontaminating a surface which has been contaminated with a toxic chemical agent. The copolymer powders of the '477 Patent function as a vehicle for the decontaminating agent rather than for the decontamination of the toxic chemical agent.

In addition, the '477 copolymer materials are prepared by solvent polymerization and result in a copolymer which has a mixture of particles which range from less than one micron in diameter to 1200 microns in diameter. The result of such wide range of diameters is that the adsorption process is adversely affected in that the wide range of pore diameters will result in some of the material not participating in adsorbing and holding the toxic decontaminating agent and the toxic agent itself. The decontaminating agent itself is added to the copolymer powder after the monomers have been polymerized to form the powder.

The '477 Patent discloses that the copolymer is prepared using ethylene glycol dimethacrylate monomer and lauryl methacrylate monomer. Although the monomers used in the '477 Patent are described as a monounsaturated monomer and a polyunsaturated monomer, the only monomers disclosed are acrylic in nature. It is known that acrylic polymers, such as those disclosed in the '477 Patent, will react with hydroxide groups. Thus, the hydroxide decontaminating agents for which the copolymers are carriers, will react with the copolymer itself. Although this reaction may take place slowly, the reaction will adversely affect the stability of the composition, in that ester decomposition will occur, with consumption of the decontaminant hydroxide ion and the shelf life and efficacy of the copolymer powder with sodium hydroxide will be shortened.

It is an object of this invention to provide a process for removing toxic agents from a surface which process is extremely effective.

Another object of this invention is to provide a process for removing toxic agents from a surface wherein the active component has an amount of water which renders it effective against both mustard agent and nerve agent.

Other objects and advantages will become apparent from the following more complete description and claims.

SUMMARY OF THE INVENTION

Broadly this invention contemplates a process for removing toxic agents from a surface, comprising contacting said surface with a sorbent selected from the class consisting of carbonaceous resins containing a hydroxide of sodium, potassium or lithium within its pores, a macroreticular ion exchange resin having a strong base hydroxide functionality and a macronet resin which has been impregnated with a Lewis acid and when said sorbent is a macroreticular ion exchange resin, said sorbent contains from about 17% to about 23% of water, based on the weight of said sorbent, and removing said toxic agent from said surface.

DETAILED DESCRIPTION

The resins which are used in practicing the process of this invention are either a carbonaceous adsorbent which contains a sodium, potassium or lithium hydroxide imbibed within its pores or a macroreticular ion exchange resin which has a strong base hydroxide functionality, or a macronet resin which has been impregnated or imbibed with a Lewis acid.

Carbonaceous resins may be prepared as described in U.S. Pat. No. 4,040,990, issued Aug. 9, 1977, and incorporated herein by reference. U.S. Pat. No. 4,040,990 describes the preparation of partially pyrolyzed particles of macroporous resinous polymers, preferably in the form of beads or spheres, by pyrolyzing, in an inert atmosphere, beads of a macroreticular synthetic polymer which has been substituted with a carbon-fixing moiety, such as sulfonate, carboxyl, amine, halogen, oxygen, etc. Introduction of these groups may be accomplished by conventional functionalizing steps or by imbibing. The controlled pyrolysis is conducted at a temperature of from about 300° C. to about 900° C.

The carbonaceous resins used in practicing this process may have the sodium, potassium or lithium hydroxide imbibed within the pores, after preparation of the carbonaceous adsorbent, with a hydroxide of the desired metal by placing the carbonaceous adsorbent in a solution of sodium hydroxide or other hydroxide and allowing it to stand for a measured period of time. Thereafter, the carbonaceous resins are removed from the solution and dried. By weighing the resins before immersion in the sodium hydroxide solution and after removal from the sodium hydroxide solution and drying, the amount of sodium hydroxide imbibed within the pores of the carbonaceous resin may be determined.

Generally speaking, it is desirable to have a carbonaceous resin which has from about 10% to about 24% of sodium potassium or lithium hydroxide, based on the weight of the resin plus hydroxide, imbibed within its pores.

If less than about 10% has been imbibed within its pores, then the efficacy of the carbonaceous resin when used in practicing the process of this invention will be adversely affected. Although there is no advantage to using more than about 24%, by weight of sodium hydroxide within the pores of the carbonaceous resin, such greater amounts may in fact be used without any adverse affect. Care must be taken however to assure that the amount of sodium hydroxide within the carbonaceous resin is not so large as to block a substantial portion of the pores of the resin so that its ability to absorb toxic agents is adversely affected.

Macroreticular ion exchange resins and their preparation are described in U.S. Pat. No. 4,224,415, issued Sep. 23, 1980 and incorporated herein by reference. They may also be prepared as described in U.S. Pat. No. 4,839,331, issued Jun. 13, 1989 and incorporated herein by reference.

Basically, macroreticular ion exchange resins may be prepared by suspension polymerization of monomers such as styrene and divinyl benzene in the presence of a precipitant such as methyl amyl alcohol. Conversion of the macroreticular copolymer to the anion exchange resin may be accomplished by chloromethylation of the macroreticular copolymer followed by reaction of the chlororomethylated macroreticular copolymer with an appropriate amine, for example, trimethylamine.

Introduction of hydroxide functionality into the resin may be achieved by ion exchange of a hydroxide ion for, as an example, a chloride ion by passing a 2% to 10% solution of, for example, sodium hydroxide through a column which contains a macroreticular resin in the chloride ion form. Such a procedure is well know in the art. The amount of water and the amount of hydroxide functionality is determined by removing a resin sample, treating the resin with a water soluble inorganic nitrate and titrating the effluent from the treatment, with a standardized acid. The amount of water is determined by weighing a wet resin sample, drying in an oven and weighing the dry resin.

In order for the hydroxide functionalized macroreticular resin to have maximum effectiveness in removing blister agents, such as mustard agent and nerve agents such as Sarin, the hydroxide functionalized macroreticular resin should contain from about 17 to about 23% of water, by weight of the resin plus water. This may be accomplished by drying the resin after it has been converted to the hydroxide form, under gentle conditions such as with a nitrogen stream at room temperature so that the surface of the resin is dried but the water is not removed from the resin pores.

If less than about 17% of water is present, then the resin will not have proper effectiveness against both the blister agent and nerve agent and instead will have efficacy in decontaminating the blister agent whereas its efficacy in decontaminating nerve agent will have been severely reduced. If more than about 23% of water is present, then the situation will be reversed and the hydroxide functionalized macroreticular resin will have efficacy in decontaminating nerve agent but will demonstrate reduced efficacy in decontaminating the blister agent.

For the macronet and carbonaceous resin sorbent, the specific surface area should vary from about 290 $m^2/g$ to about 1700 $m^2/g$. In this manner, efficacy of the sorbents for decontaminating toxic agents is assured.

Specific surface area for the wet macroreticular resin sorbent is not meaningful because this resin sorbent contains water which would be removed when measuring specific surface area so that the surface area determination would be for a material not contemplated by this invention.

The sorbents which are used may have an average particle size of up to about 50 microns in diameter. Particle sizes in excess of about 50 microns in diameter may not be desired because such excessive particle size may result in loss of efficacy for decontamination of a surface. It is preferred however that the average particle size be from about 5 microns to about 20 microns in diameter.

The macronet resins which are used in practicing this invention may be prepared as described in U.S. Pat. No. 4,263,407, which is incorporated herein by reference. The 4,263,407 patent describes the preparation of macronet resins by swelling a lightly crosslinked macroreticular aromatic polymer bead in an inert organic solvent and then post crosslinking by contacting the swollen polymer beads with an external crosslinker which may be a polyfunctional alkylating or acylating agent and a sulphur halide.

A Lewis acid, such as aluminum chloride, ferric chloride or zinc chloride is imbibed into the macronet resin by addition of a Lewis acid, such as aluminum chloride, in a solvent such as methylene chloride to the macronet resin, agitating the slurry at room temperature for from about one hour to six hours. The resin is removed from the slurry, washed with solvent and dried to constant weight with a nitrogen stream or air stream.

In order to demonstrate the effectiveness of the process of this invention for removing toxic agents from a surface, simulated toxic agents are employed. These simulated agents are diisopropylfluorophosphate (DFP), a nerve agent simulant and chloroethylisobutyl sulfide (CIS), a blister agent simulant.

In order to more fully illustrate the nature of this invention and the manner of practicing the same, the following examples are presented.

Preparation of Macronet Sorbents Impregnated With Lewis Acids

To a 250 milliliter Erlenmeyer flask is added 5 grams of macronet sorbent beads, prepared as described in Example 1B of U.S. Pat. No. 4,263,407, and 50 milliliters of methylene chloride. The beads remain in the methylene chloride for 15 minutes. To the bead/methylene chloride mixture is then added 0.5 gram of aluminum chloride (0.5 g per 5 grams of sorbent). The flask containing the beads/methylene chloride/aluminum chloride mixture is placed on a shaker and the mixture is agitated for three hours. After agitation, the methylene chloride is filtered from the now dark sorbent beads. The sorbent beads are then washed three times with 50 ml. portions of methylene chloride and is then dried to constant weight under a nitrogen stream. The sorbent beads contained 0.98% by weight of aluminum as determined by elemental analysis.

The above procedure is repeated several times except that zinc chloride (0.7 g. per 7 grams of sorbent) and ferric chloride (0.7 g. per 7 grams of sorbent) are, separately, substituted for the aluminum chloride. When zinc chloride is substituted, the impregnated macronet sorbent contains 0.52% by weight of zinc as determined by elemental analysis, and when ferric chloride is substituted, the impregnated macronet sorbent contains 1.44% by weight of iron as determined by elemental analysis.

Preparation Of Macroreticular Strong Base Ion Exchange Resin In the Hydroxide Form Fifty grams of the chloride of Duolite ® A-165 macroreticular strong base resin is placed in a beaker and is slurried with deionized water and then poured into a one inch diameter glass column which is fitted with a glass filter. The resin in the column is then treated with 1,000 milliliters of a 1.0 normal sodium bicarbonate solution at a rate of 17 milliliters per minute, rinsed thoroughly with 500 milliliters of deionized water and is then treated with 2000 milliliters of a 2 normal sodium hydroxide solution, which is under a nitrogen blanket, at a flow rate of 17 milliliters per minute. The resin in the column is then finally rinsed with deionized water until the pH of the rinse water is neutral. The wet sorbent beads are then dried at room temperature, under a nitrogen stream, to a moisture content of from about 17% to about 23% by weight of the resin plus water.

Preparation Of Sodium Hydroxide Imbibed Carbonaceous Adsorbent

To a wide mouth eight ounce jar is added forty grams of carbonaceous adsorbent and 9.6 grams of 50% sodium hydroxide dissolved in 6.4 grams of methanol. The mixture is stirred for one minute with a glass stirring rod. The jar is then closed and sealed with tape, and then placed on a roller for four hours to assure adequate mixing. The resultant sodium hydroxide imbibed beads are then dried under nitrogen to constant weight.

The resultant imbibed sorbent contains about 11% sodium hydroxide although, by varying the amount of 50% sodium hydroxide used, sorbents containing from 10 to 24% sodium hydroxide based on the weight of said sorbent plus hydroxide, may be prepared.

In the examples which follow, the following materials are used as simulants for the following toxic agents. Diisopropylfluorophosphate-(DFP). This material is a G agent simulant (nerve agent). Chloroethylisobutyl sulfide-(CIS). This is a simulant for a mustard blister agent such as bis-chloroethylsulfide.

EXAMPLES 1-10

Examples 1 through 10 demonstrate the reactivity of macroreticular strong base ion exchange resins in the hydroxide form with the DFP and CIS simulants. Reactivity of the resins of examples 1 through 10 is determined by addition of the neat simulant to the resin powder followed by mixing and extraction of the simulant with a suitable solvent at pre-determined time periods. The amount of simulant remaining after contact with the resin is determined by gas chromatographic analysis. It is believed that unrecovered simulant is destroyed by reaction with the reactive group of the macroreticular resin. Each test is conducted in duplicate and the average value is reported.

The test protocol for determining the reactivity of the strong base macroreticular ion exchange resin with the simulant is as follows:

1. A 1.0 gram sample of the macroreticular strong base resin, in powder form is placed into a 25 milliliter vial.
2. Thirty microliters of simulant (either DFP or CIS) is added to the vial. The vial is then stirred with a glass rod for two minutes and is then allowed to stand for the specified reaction time.
3. At the conclusion of the reaction time, twenty milliliters of isopropyl alcohol is added to the vial using an automatic pipet. The vial is then capped, shaken for two minutes and approximately five milliliters of the suspension is filtered through a 0.45 micron syringe filter.
4. A 500 microliter aliquot of the filtered suspension is transferred to a clean septum vial which contains 500 microliters of an internal standard solution (2 milligram per milliliter of either octane or decane).
5. A gas chromatography calibration standard is prepared by placing a 500 microliter aliquot of a solution containing 30 microliters of the simulant dissolved in 20 milliliters of isopropyl alcohol in a clean septum vial. The septum vial also contains 500 microliters of the internal standard solution referred to in step 4 above.
6. Both the standard solution prepared in step 5 above and the sample solution prepared in step 4 above are analyzed by capillary gas chromatography and the analytical results of the sample prepared in step 4 is compared with the analytical results of the sample prepared in step 5. The results are reported as the percent of unreacted simulant. The instruments used for conducting the above-described test is a Hewlett Packard 5890 gas chromatograph equipped with a Hewlett Packard 7673A Automatic Injector system, a flame ionization detector (to detect CIS) and a nitrogen phosphorus detector (to detect DFP).

The resin used is a macroreticular ion exchange resin having a hydroxide functionality (Duolite® A-165 obtained from Rohm and Haas Company). The results are as follows:

TABLE I

Reactivity Macroreticular Ion Exchange Resin With Hydroxide Functionality

| Examples | % Water In Resin | % DFP Remaining After 10 Minutes | % CIS Remaining After 10 Minutes |
|---|---|---|---|
| 1 | 15.6 | 43.0 | 0.0 |
| 2 | 17.4 | 8.5 | 0.0 |
| 3 | 18.7 | 0.0 | 9.4 |
| 4 | 23.8 | 0.0 | 84.0 |
| 5 | 25.8 | 0.2 | 10.1 |
| 6 | 30.0 | 0.1 | 93.8 |
| Fuller's Earth | — | 66.1 | 3.6 |

As is seen from the above, a sorbent which is a macroreticular ion exchange resin having a strong base hydroxide functionality is effective in neutralizing the toxic agent simulants for nerve agent and blister agents.

EXAMPLES 7-10

The sorbent used in this example is a carbonaceous adsorbent having sodium hydroxide imbibed within its pores. The test protocol for determining sorbent reactivity is modified for this example in that at the end of the reaction period (step 3 described above) 1.0 gram of ground Amberlyst® XN-1010, a strong acid resin obtained from Rohm and Haas Company of Philadelphia, Pa, is added to the sorbent suspension and mixed prior to adding the isopropyl alcohol. The remainder of the procedure is the same as described earlier. The results are set forth in Table II below.

TABLE 2

Reactivity Carbonaceous Adsorbent Containing Imbibed Sodium Hydroxide

| Examples | % Sodium Hydroxide Imbibed | % DFP Remaining 10 Min. | % DFP Remaining 24 Hrs. | % CIS Remaining 10 Min. | % CIS Remaining 24 Hrs. |
|---|---|---|---|---|---|
| 7 | 14 | 6.7 | — | 53.5 | 36.6 |
| 8 | 14 | 9.8 | 1.5 | 46.2 | 27.2 |
| 9 | 19 | 22.4 | 5.7 | — | 25.7 |
| 10 | 24 | 3.4 | 0.8 | — | 9.3 |
| *Fullers Earth | — | 66.1 | | 3.6 | |

*Results copied from Table 1

Vapor Desorption Tests

The Vapor Desorption test measures the ability of the sorbent to retain neat liquid simulant in the presence of a constant air stream. The vapor sorbent test measures the ability of the sorbents to prevent a secondary contamination hazard which would be created by release of a toxic agent back into the atmosphere. In this test, simulant is applied as a liquid directly to the powdered sorbent. The sorbent is then placed into a tube where a stream of conditioned air passes over the resin. The amount of simulant retained by the resin, as well as the amount that is desorbed, is then determined.

The test procedure for determining vapor phase desorption is as follows:

The apparatus used consists of six gas trains, each of which is made up of three 30 milliliter gas impingers arranged in a series. Each of the six trains are fed by compressed air which has been passed through a drying column. At the entrance to each train is a flow meter for monitoring and controlling the flow of dried air. The first impinger in each train (referred to as "A") is used to hold the toxic agent simulant and sorbent from which desorption may occur. The next two impingers (hereinafter "B" and "C") are filled with a collecting solution or solvent. The procedure used is as follows:

1. The B and C gas impingers are each filled with 20 milliliters of 2-isopropanol.
2. 0.25g samples of the sorbents are placed into 20 milliliter plastic vials. Fifty microliters of the toxic agent simulant is then pipeted into the A gas impinger, and the sample is also placed into the gas impinger A. The impingers are then attached to the apparatus.
3. A blank is prepared by adding 25 milliters of 2-isopropanol to the volume of simulant which is added to the A gas impinger.
4. The A impingers are placed in a constant temperature bath which is maintained at a temperature of 37° C. and an air stirrer is turned on.
5. The air bubbler is then turned on at a rate of 100 milliliters of air per minute (±5 ml./minute). The flow meters are then checked with a Hewlett Packard soap film flow meter attached to the C gas impinger.
6. The flow meter readings are recorded and adjusted, as needed, every half hour.
7. Three tenths milliliter of 99% plus decane is diluted to 100 milliliters with 2-isopropanol. One milliliter of this standard solution is then added to each of 18 half ounce glass vials (one for each gas impinger used). This is the internal standard solution.
8. The flow of air is continued for five hours. The gas impinger bases are then removed starting with the C gas impinger. The C and B gas impingers are capped immediately after removal from the equipment.
9. The A gas impinger bases are removed and 25 milliliters of 2-isopropanol is then added. The A gas impinger bases are then capped and briefly shaken.
10. The contents of the B and C gas impinger bases are diluted to 25 milliliters in a volumetric flask.
11. From each gas impinger base, 2 milliliters of the diluted solution is removed to the previously prepared glass vials of step 7 above.
12. The A gas impinger bases must be shaken and immediately filtered by using a syringe fitted with a 0.45 micron Supelco disposable filter.
13. A minimum of 3 milliliters of solution from step 11 is then dispensed into a clean ½ ounce glass vial, making certain the solution is clear. Two milliliters of this solution is then placed into a previously prepared vial containing the standard solution of step 7.
14. The test solutions are then analyzed for the presence of simulant by gas chromatography using the same method and equipment used for determining reactivity.

EXAMPLES 11-22

The sorbents used in the vapor desorption tests are macroreticular ion exchange resins having a hydroxide functionality and containing 17-23% water, macronet resins impregnated with a Lewis acid and carbonaceous adsorbents having sodium hydroxide within its pores. The results are set forth in Tables 3 through 5.

TABLE 3

VAPOR DESORPTION
Macroreticular Ion Exchange Resin With Hydroxide Functionality

| Example | Sorbent Used | % DPF Desorbed From Sorbent | % CIS Desorbed From Sorbent |
|---|---|---|---|
| 11 | sorbent of Example 1 | 42.1 | 8.9 |
| 12 | sorbent of Example 2 | 9.6 | 2.9 |
| 13 | sorbent of Example 3 | 4.2 | 8.0 |
| 14 | sorbent of Example 4 | 11.9 | 5.0 |
| 15 | sorbent of Example 5 | 6.5 | 7.1 |
| 16 | sorbent of Example 6 | 7.3 | 4.0 |
| Fullers Earth | | 3.7 | 15.8 |

TABLE 4

VAPOR DESORPTION
Carbonaceous Adsorbent Containing Imbibed Sodium Hydroxide

| Example | Sorbent Used | % DPF Desorbed From Sorbent | % CIS Desorbed From Sorbent |
|---|---|---|---|
| 17 | sorbent of Example 7 | 1.4 | 2.8 |
| 18 | sorbent of Example 8 | 7.9 | 5.3 |
| 19 | sorbent of Example 9 | 4.4 | 3.0 |
| 20 | sorbent of Example 10 | 5.3 | 6.4 |
| *Fullers Earth | | 3.7 | 15.8 |

*Results copied from Table 3.

TABLE 5

VAPOR DESORPTION
Macronet Adsorbents Imbibed With Lewis Acid

| Example | Amount of Lewis Acid in Macronet Resin | % DPF Desorbed From Sorbent | % CIS Desorbed From Sorbent |
|---|---|---|---|
| 21 | 4.8 wt. % AlCl$_3$ | 0.4 | 0.3 |
| 22 | 1.1 wt. % Zncl$_2$ | 0.3 | 0.0 |
| *Fuller's Earth | | 3.7 | 15.8 |

*Results copied from Table 3.

The macronet resins imbibed with Lewis Acid is prepared in the manner described earlier.

As is readily seen from the data in tables 3 through 5, the sorbents used in the process of this invention are effective in removing, holding and/or destroying toxic agents.

While this invention has been described in terms of certain preferred embodiments and illustrated by means of specific examples, the invention is not to be construed as limited except as set forth in the following claims.

I claim:

1. A process for removing toxic agents from a surface comprising contacting said surface with carbonaceous adsorbent particles having an average particle size of up to about 50 microns in diameter, produced by the controlled thermal decomposition of a macroporous synthetic polymer, and containing a hydroxide of sodium, potassium or lithium within their pores, and removing said toxic agent from said surface.

2. A process for removing toxic agents from a surface comprising contacting said surface with a macronet resin sorbent having an average particle size of up to about 50 microns in diameter, which has been impregnated with a Lewis acid, and removing said toxic agent from said surface.

3. A process according to claim 2 wherein said Lewis acid is aluminum chloride, ferric chloride, or zinc chloride.

4. A process according to claim 1 wherein said sorbent is derived from a styrenedivinylbenzene copolymer.

5. A process for removing toxic agents from a surface comprising contacting said surface with a macroreticular ion exchange resin having an average particle size of up to about 50 microns in diameter and a strong base hydroxide functionality, and said ion exchange resin contains from about 17 to about 23% of water by weight of said resin, and removing said toxic agent from said surface.

6. A process according to claim 1 wherein said toxic agent is an organophosphorus compound.

7. A process according to claim 1 wherein said toxic agent is a mustard blister agent.

8. A process according to claim 1 wherein the specific surface area of said adsorbent particles is from about 290 m$^2$/g to about 1700 m$^2$/g.

9. A process according to claim 1 wherein said adsorbent particles contain from about 10% to about 25% of a hydroxide of sodium, potassium or lithium within their pores, based on the weight of said resin plus hydroxide.

10. A process according to claim 2 wherein said toxic agent is an organophosphorus compound.

11. A process according to claim 2 wherein said toxic agent is a mustard blister agent.

12. A process according to claim 4 wherein said toxic agent is an organophosphorus compound.

13. A process according to claim 4 wherein said toxic agent is a mustard blister agent.

14. A process according to claim 2 wherein the specific surface area of said sorbent is from about 290 m$^2$/g to about 1700 m$^2$/g.

* * * * *